United States Patent
Lin et al.

(10) Patent No.: US 9,665,291 B2
(45) Date of Patent: May 30, 2017

(54) MIGRATION OF HOT AND COLD DATA BETWEEN HIGH-PERFORMANCE STORAGE AND LOW-PERFORMANCE STORAGE AT BLOCK AND SUB-BLOCK GRANULARITIES

(71) Applicant: Huawei Technologies Co., Ltd., Shenzhen (CN)

(72) Inventors: Yu Lin, Chengdu (CN); Shangdong Liang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 14/190,264

(22) Filed: Feb. 26, 2014

(65) Prior Publication Data
US 2014/0181400 A1    Jun. 26, 2014

Related U.S. Application Data

(63) Continuation of application No. PCT/CN2012/086670, filed on Dec. 14, 2012.

(30) Foreign Application Priority Data

Dec. 31, 2011    (CN) .......................... 2011 1 0460211

(51) Int. Cl.
*G06F 12/00* (2006.01)
*G06F 13/00* (2006.01)
*G06F 3/06* (2006.01)

(52) U.S. Cl.
CPC .......... *G06F 3/0613* (2013.01); *G06F 3/0608* (2013.01); *G06F 3/0611* (2013.01);
(Continued)

(58) Field of Classification Search
None
See application file for complete search history.

(56) References Cited

U.S. PATENT DOCUMENTS

| 8,315,995 B1 * | 11/2012 | Levy ................. G06F 17/30132 707/694 |
| 8,572,312 B2 * | 10/2013 | Tofano .................. G06F 3/0608 711/103 |

(Continued)

FOREIGN PATENT DOCUMENTS

| CN | 101105772 A | 1/2008 |
| CN | 101533335 A | 9/2009 |

(Continued)

OTHER PUBLICATIONS

Foreign Communication From a Counterpart Application, PCT Application No. PCT/CN2012/086670, English Translation of Chinese Search Report dated Mar. 21, 2013, 2 pages.

(Continued)

*Primary Examiner* — Jared Rutz
*Assistant Examiner* — Marwan Ayash
(74) *Attorney, Agent, or Firm* — Conley Rose, P.C.

(57) ABSTRACT

A method and an apparatus for tiered storage processing of data, and a storage device. The method includes: splitting the migration unit into multiple migration subunits when a migration unit of low-tier disks is migrated to high-tier disks, and detecting a data access frequency of each migration subunit respectively; migrating the migration subunit to the low-tier disk when detecting that the data access frequency of the migration subunit is lower than a set threshold; and combining the multiple migration subunits into the migration unit when detecting that the multiple migration subunits are all migrated to the lower-tier disk. The present (Continued)

invention improves usage of storage media, and controls metadata storage resource consumption effectively.

8 Claims, 3 Drawing Sheets

(52) U.S. Cl.
CPC .......... *G06F 3/0647* (2013.01); *G06F 3/0649* (2013.01); *G06F 3/0665* (2013.01); *G06F 3/0685* (2013.01); *G06F 3/0689* (2013.01); *G06F 2003/0692* (2013.01)

(56) References Cited

U.S. PATENT DOCUMENTS

| | | | | |
|---|---|---|---|---|
| 8,775,759 | B2* | 7/2014 | Tofano | G06F 3/0641 711/165 |
| 9,235,353 | B2* | 1/2016 | Iwamitsu | G06F 3/0604 |
| 2008/0016297 | A1 | 1/2008 | Bartley et al. | |
| 2009/0132769 | A1 | 5/2009 | Pronovost et al. | |
| 2011/0035548 | A1 | 2/2011 | Kimmel et al. | |
| 2012/0079318 | A1* | 3/2012 | Colgrove | G06F 3/0688 714/6.22 |
| 2012/0198152 | A1* | 8/2012 | Terry et al. | 711/114 |
| 2013/0073783 | A1* | 3/2013 | Cao | G06F 3/0611 711/103 |
| 2013/0151756 | A1 | 6/2013 | Tofano | |

FOREIGN PATENT DOCUMENTS

| | | |
|---|---|---|
| CN | 101861573 A | 10/2010 |
| CN | 102096561 A | 6/2011 |
| CN | 102118433 A | 7/2011 |

OTHER PUBLICATIONS

Foreign Communication From a Counterpart Application, PCT Application No. PCT/CN2012/086670, Chinese Written Opinion dated Mar. 21, 2013, 4 pages.
Cao, M., "Hot Cold Data Tracking and Migration in btrfs," Linux Plumbers Conference 2010, IBM, XP055139778, Retrieved from the Internet: URL:http://ww.linuxplumbersconf.org/2010/ocw/system/presentations/219/original/hot_cold_data_LPC.pdf, Nov. 3, 2010, 18 pages.
Foreign Communication From a Counterpart Application, European Application No. 12861614.1, Extended European Search Report dated Sep. 19, 2014, 7 pages.
Office Action dated Jun. 12, 2015, 15 pages, U.S. Appl. No. 14/706,616, filed May 7, 2015.
Foreign Communication From a Counterpart Application, Chinese Application No. 201110460211.X, Chinese Search Report dated Oct. 19, 2015, 2 pages.
Foreign Communication From a Counterpart Application, Chinese Application No. 201110460211.X, Chinese Office Action dated Nov. 3, 2015, 5 pages.
Office Action dated Aug. 24, 2016, 18 pages, U.S. Appl. No. 14/706,616, filed May 7, 2015.

* cited by examiner

MIGRATION OF HOT AND COLD DATA BETWEEN HIGH-PERFORMANCE STORAGE AND LOW-PERFORMANCE STORAGE AT BLOCK AND SUB-BLOCK GRANULARITIES

CROSS-REFERENCE TO RELATED APPLICATION

This application is a continuation of International Application No. PCT/CN2012/086670, filed on Dec. 14, 2012, which claims priority to Chinese Patent Application No. 201110460211.X, filed on Dec. 31, 2011, both of which are hereby incorporated by reference in their entireties.

TECHNICAL FIELD

The present invention relates to storage technologies, and in particular, to a method for a storage device processing data and a storage device.

BACKGROUND

Tiered storage refers to setting an existing storage device as disk tiers and setting different types of disks onto different tiers so that data can be migrated between different tiers according to data access requirements. For example, a solid state disk (SSD) set comprises a plurality of SSDs. Each of the SSDs is a high-tier disk characterized by a high access speed, and a hard disk drive (HDD) set comprises a plurality of HDDs. Each of the HDDS is a low-tier disk characterized by a low access speed. In the practice of tiered storage, infrequently accessed data is stored into a disk tier characterized by a low access speed such as a HDD set, and frequently accessed data is stored into a disk tier characterized by a high access speed such as a SSD set, and therefore, in accessing frequently used data, the data access speed and the storage device access efficiency are enhanced.

A disk generally stores data in the form of data blocks. Multiple storage units of the same size are set in the disk, and each storage unit is configured to store one data block. When data is migrated between different tiers, the data block as a whole is migrated. Even if only a part of data (called "hot data") in the data block has an access frequency rising to a set threshold and needs to be migrated to a high-tier disk set, the data block as a whole is actually migrated. That is, the "cold data" (data whose access frequency is still low) in the data block moves together with "hot data". The data block is generally called a "migration unit", indicating that the data block is a unit of migration. In addition, the storage device further includes metadata storage resources used to store metadata, where the metadata is information corresponding to a migration unit, for example, a storage address of the migration unit, and each migration unit has corresponding metadata, and therefore, the consumption amount of the metadata storage resources is proportional to the number of migration units.

Currently, the size of the "migration unit" is generally fixed, such as 256 megabytes (MB). However, the setting of the migration units of a fixed size brings the following problems: if the set size of the migration unit is large, few metadata storage resources are consumed, but the phenomenon that cold data moves together with the hot data will lead to waste of the storage space of the expensive high-tier storage medium and low usage of space; and, if the set size of the migration unit is small, the waste of the high-tier storage medium is reduced naturally, but more metadata storage resources are consumed.

SUMMARY

One aspect of the present invention provides a method for a storage device processing data to improve usage of storage media and control reasonableness of metadata storage resource consumption.

Another aspect of the present invention provides data storage device to improve usage of storage media and control reasonableness of metadata storage resource consumption.

The method for a storage device processing data provided in the present invention includes: obtaining an access frequency of a block of the second storage set; determining that the access frequency of the block achieves a first access threshold value; based upon the determination, moving the block to the first storage disk set; obtaining an access frequency of each of sub-blocks into which the block is divided; determining that an access frequency of at least one of the sub-blocks is less than a second access threshold value; and based upon the determination, moving the determined sub-block back to the second storage disk set.

The storage device provided in the present invention comprises a processor, a communication interface, and a communication bus, wherein the processor communicates with the communication interface through the communication bus and the processor is configured to obtain an access frequency of a block of a second storage set, wherein the second storage set includes a plurality of storage disks with low performance; determine that the access frequency of the block achieves a first access threshold value; based upon the determination, move the block to a first storage disk set, wherein the first storage disk set includes a plurality of storage disks with high performance; obtain an access frequency of each of sub-blocks into which the block is divided; determine that an access frequency of at least one of the sub-blocks is less than a second access threshold value; and based upon the determination, move the determined sub-block back to the second storage disk set.

Technical effects of the method for a storage device processing data in the present invention are: when a migration unit is migrated to a high-tier disk set, a data access frequency of each migration subunit is detected respectively so that hot data can be identified more easily; and when cold data is identified, the migration subunit corresponding to the cold data can be migrated to a low-tier disk set, thereby reducing waste of the storage space of the high-tier disk, so that the high-tier disk stores only hot data, and improving the usage of storage media; in addition, when all migration subunits are migrated to the low-tier disk set, integration can be performed by combining all the migration subunits into a migration unit, thereby reducing the number of migration units in time and controlling metadata storage resource consumption effectively.

Technical effects of the storage device in the present invention are: when a migration unit is migrated to a high-tier disk set, a data access frequency of each migration subunit is detected respectively so that hot data can be identified more easily; and when cold data is identified, the migration subunit corresponding to the cold data can be migrated to a low-tier disk set, thereby reducing waste of the storage space of the high-tier disk, so that the high-tier disk stores only hot data, and improving the usage of storage media; in addition, when all migration subunits are migrated to the low-tier disk set, integration can be performed by combining all the migration subunits into a migration unit, thereby reducing the number of migration units in time and controlling metadata storage resource consumption effectively.

DESCRIPTION OF EMBODIMENTS

Embodiment 1

Figure 1:
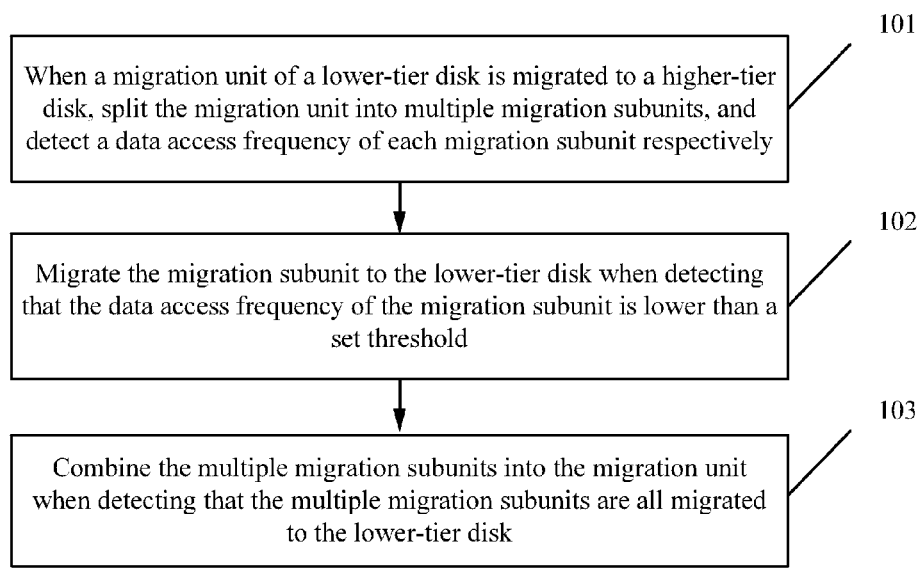
FIG. 1 is a schematic flowchart of an embodiment of a method for a storage device processing data according to the present invention.

FIG. 1 is a schematic flowchart of an embodiment of a method for a storage device processing data according to the present invention. As shown in FIG. 1, the method in this embodiment may include the following steps:

101. When a migration unit of a low-tier disk set is migrated to a high-tier disk, split the migration unit into multiple migration subunits, and detect a data access frequency of each migration subunit respectively.

The low-tier disk set comprises a plurality of low-tier disks. Each of the low-tier disks is characterized by a low access speed, such as an HDD; and the high-tier disk set comprises a plurality of high-tier disks. Each of the high-tier disks is characterized by a high access speed, such as an SSD, that is, the high-tier disk provides a better performance and a higher speed than the low-tier disk.

The migration unit and the migration subunit refer to data blocks stored in the disk and migrated as an integral unit. The migration unit of a low-tier disk generally refers to a migration unit of a large size such as 256 MB; and, when the migration unit becomes hot and is migrated to a high-tier disk, the migration unit is split into multiple migration subunits of a smaller size such as 32 MB. In this embodiment, the number of migration subunits obtained after the splitting is not limited. For example, a migration unit may be split into four migration subunits or eight migration subunits. In addition, the size of the migration subunits obtained after the splitting is user-definable.

Optionally, after the migration unit is split into multiple migration subunits, storage address information of the multiple migration subunits is recorded respectively to ensure correct data access subsequently. For example, assuming that the migration unit is split into four migration subunits, the specific physical storage addresses of the four migration subunits in the high-tier disk need to be recorded respectively.

102. Migrate the migration subunit to the low-tier disk when detecting that the data access frequency of the migration subunit is lower than a set threshold.

If the data access frequency of the migration subunit is lower than a set threshold, it indicates that the access frequency of the migration subunit is low, that is, infrequently accessed, and becomes "cold data", and therefore, the migration subunit is migrated to the low-tier disk in this embodiment.

In this embodiment, to improve usage of storage space of the high-tier disks, a large-sized migration unit is split into small-sized migration subunits, and therefore, hot data in the migration unit can be identified more precisely, and the cold data can be migrated back to the low-tier disk set, thereby preventing the cold data from wastefully occupying the expensive storage space in the high-tier disk set, and improving the disk usage.

103. Combine the multiple migration subunits into the migration unit when detecting that the multiple migration subunits are all migrated to the low-tier disk.

When it is detected that all migration subunits, which are obtained after the split migration unit migrated to the high-tier disk in 101, are migrated back to the low-tier disk, that is, all the migration subunits become cold again, the migration subunits are re-integrated into a large-sized migration unit in this embodiment.

The low-tier disk integrates migration subunits into a migration unit in time, thereby reducing the number of migration units and controlling the metadata storage resource consumption effectively.

In the method for a storage device processing data in this embodiment, when a migration unit is migrated to a high-tier disk set, a data access frequency of each migration subunit is detected respectively so that hot data can be identified more easily; and when cold data is identified, the migration subunit corresponding to the cold data can be migrated to a low-tier disk, thereby reducing waste of the storage space of the high-tier disks, so that the high-tier disks store only hot data, and improving the usage of storage media; in addition, when all migration subunits are migrated to the low-tier disk set, integration can be performed by combining all the migration subunits into a migration unit, thereby reducing the number of migration units in time and controlling metadata storage resource consumption effectively.

Embodiment 2

Figure 2:
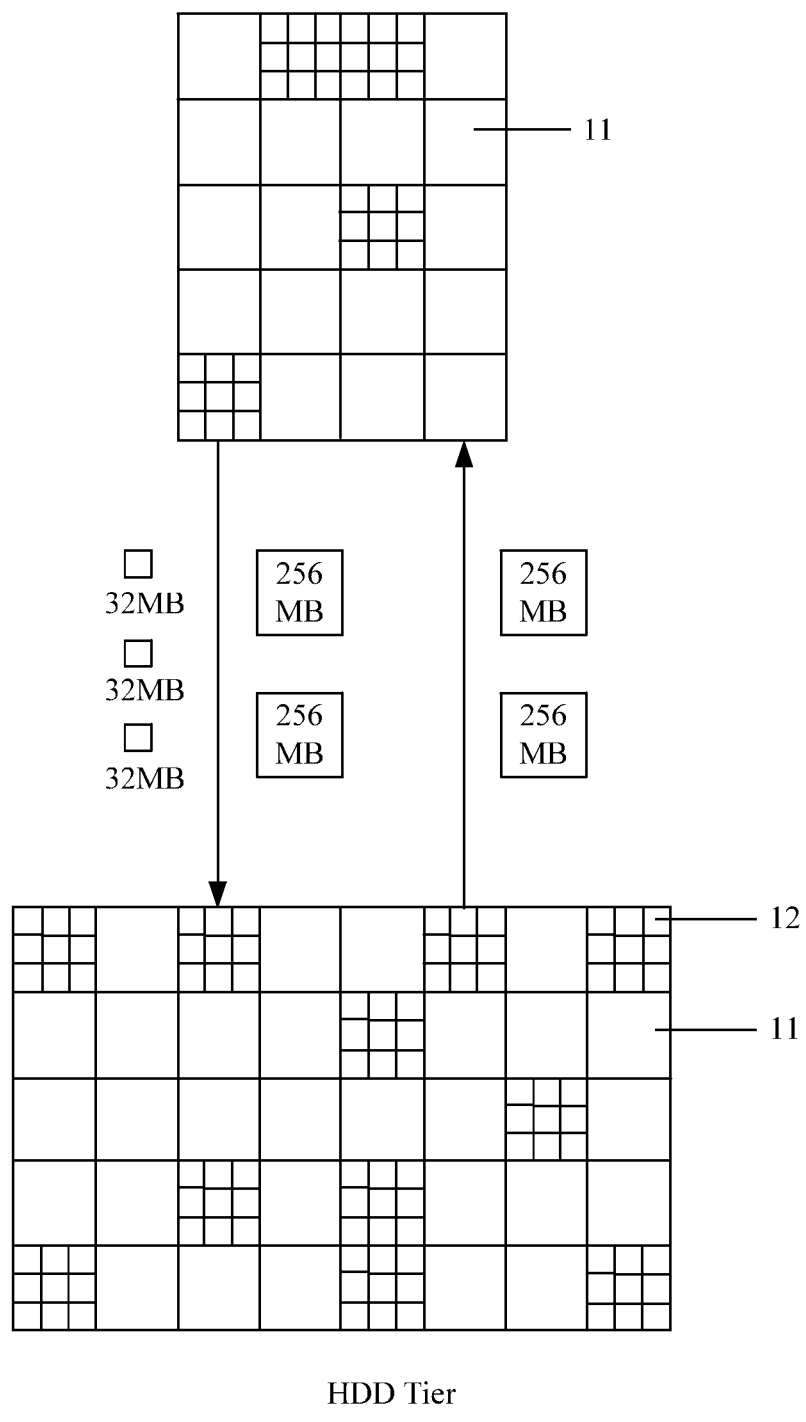
FIG. 2 is a schematic principle diagram of another embodiment of a method for a storage device processing data according to the present invention.

FIG. 2 is a schematic principle diagram of another embodiment of a method for a storage device processing data according to the present invention. In this embodiment, assuming that the low-tier disk is an HDD and the high-tier disk is an SSD, the method for a storage device processing data in the present invention is described in detail. The HDD and the SSD may be disks that are set on two different tiers in a storage device, where the storage device further includes a relevant controlling unit that is configured to control migration of data between the two tiers of disks, for example, a hotness identifying unit configured to detect the data access frequency, or a migration controlling unit configured to control data migration, or the like.

As shown in FIG. 2, the storage space in the HDDs and the SSDs is divided into multiple storage units at a large size granularity first. For example, the storage unit may be configured to store a migration unit 11 of a 256 MB size. The migration unit 11 is a data block that is stored and migrated as a whole.

After the storage space is divided into multiple storage units, a mapping relationship is created between each storage unit in the HDDs and the SSDs and a logical block address (LBA) of the storage device respectively. For example, the storage device includes HDDs and SSDs that are tiered, and logical block address information is maintained in the storage device. Data is stored in a physical storage address in the HDDs and the SSDs. However, when a read or write operation is performed for the data, the operation information carries LBA information. Then, according to the mapping relationship between the LBA in the storage device and the physical storage address, the physical storage address of the data is searched out, and the data is found. Therefore, a mapping relationship between each storage unit and the LBA is created in the storage device. Specifically, each storage unit has a corresponding storage identifier, that is, a physical storage address, where the migration unit also has a data block identifier. The mapping relationship records the data block identifier, the logical block address LBA of the data block, and mapping relationship information between the physical storage addresses, so as to identify the storage location of the data block in the disk and ensure the correctness of data reading and writing.

The hotness identifying unit in the storage device may detect the data access frequency of the migration unit 11 in each storage unit, for example, detect Input/Output (IO) statistic information of the migration unit. In addition, an access frequency threshold may be set. If the data access frequency of the migration unit is greater than the threshold, it indicates that the migration unit is frequently accessed and has become "hot data"; if the data access frequency of the migration unit is less than the threshold, it indicates that the migration unit is infrequently accessed and is "cold data".

After the migration unit becomes hot, the migration controlling unit in the storage device may control the migration unit to migrate to the SSDs; and, after the migration to the SSDs, the hotness identifying unit in the storage device in this embodiment may detect the data access frequency of each migration subunit in the migration unit respectively.

Specifically, the storage device may preset a size such as 32 MB for the migration subunit. Assuming that the size of the migration unit is 256 MB, the migration unit actually includes 8 migration subunits. After the migration unit is migrated to the SSDs, the hotness identifying unit may detect the data access frequency of the 8 migration subunits respectively rather than detect the data access frequency of the entire migration unit as a whole just like the beginning, and therefore, hot data can be identified more easily. For example, only 64 MB data in the 256 MB migration unit becomes hot and the remaining is still cold data, but because the migration unit as a whole is a unit in the statistics of IO information, the migration unit is still regarded as hot and migrated to an upper tier; and then the IO information of each migration subunit in the migration unit is detected respectively to identify precisely 2 migration subunits that become hot and the remaining 6 migration subunits that are still cold data. In this way, the identification of hot data is more precise.

Optionally, the IO statistics for each migration subunit may be performed before the splitting of the migration unit, that is, when the migration unit is still a whole without being split, and the hot data of each internal migration subunit is identified beforehand; if all the migration subunits are detected as hot data, the migration unit may remain as a whole without being split, and is stored in the large-sized storage unit of the SSDs; and, if some are detected as cold data, the migration unit is controlled to split according to the preset size of migration subunits.

Alternatively, optionally, if no idle large storage unit corresponding to the size of the migration unit exists in the SSDs, the migration unit may be split into multiple migration subunits first, and the migration subunits are migrated to the small storage unit of a corresponding size in the SSDs, and then the IO statistics are detected respectively. That is, before the migration unit is split, the storage unit configured to store the migration unit is a storage space of a large size granularity; and, after the migration unit is split, the storage space is also split into multiple storage spaces of a small size granularity to store the multiple migration subunits after the splitting. Therefore, the order between the hotness identification and the migration unit splitting is not limited strictly, and any order is appropriate as long as the IO statistic information of each migration subunit of the migration unit in the SSDs can be detected and the hot data can be identified.

Assuming that it is already identified that the migration unit includes migration subunits corresponding to cold data, the migration unit 11 is split into multiple migration subunits 12 such as 32 MB; and the migration controlling unit controls the migration subunits corresponding to the cold data to migrate back to the HDDs so that the cold data no longer occupies the expensive storage space in the SSDs, which improves usage of the SSDs' storage space. In addition, the hot data identification is performed in the SSDs all along, that is, the IO statistic information of each migration subunit is detected respectively, and, once it is found that hot data changes to cold data, the cold data is migrated back to the HDDs.

In this embodiment, after the migration unit 11 is split into multiple migration subunits 12, to ensure data access correctness, the mapping relationship information needs to be updated. That is, in this case, the physical storage address of the migration unit 11 on the disk has changed, and the migration unit has been split into multiple migration subunits 12, where the multiple migration subunits 12 may be stored in various addresses in a distributed manner. Therefore, the mapping relationship between the migration unit and the multiple migration subunits needs to be recorded, and the current physical storage addresses of the multiple migration subunits need to be recorded. For example, the mapping relationship between the data block identifier of the migration unit 11 and the LBA of the data block remains unchanged. In searching for the migration unit 11 according to the LBA, the multiple migration subunits 12 obtained after the split migration unit 11 can be found. Some of the migration subunits 12 are stored in the physical storage addresses a1, a2, . . . , in the SSDs, and other migration subunits 12 are stored in the physical storage addresses b1, b2, . . . , in the HDDs. In specific implementation, addressing may be performed by means of arrays, and an array member points to a migration subunit in the HDDs and the SSDs respectively.

Optionally, when the migration unit in the HDDs is migrated to the SSDs, the idle large-sized storage unit corresponding to the size of the migration unit in the SSDs is preferred; when a cold migration subunit in the SSDs is migrated to the HDDs, the idle small-sized storage unit corresponding to the size of the migration unit in the HDDs is preferred; and, when the cold migration subunit in the HDDs becomes hot again, the migration subunit is preferably migrated to the idle small-sized storage unit corresponding to the size of the migration subunit in the SSDs.

In this embodiment, the migration subunit migrated back to the HDDs undergoes IO statistics by using the migration subunit as a unit. The storage device maintains a count value for each migration unit, and the count value is used to obtain the number (which may be referred to as a first number) of migration subunits in the SSDs, or obtain the number (which may be referred to as a second number) of migration subunits in the HDDs; and, if the first number is zero or the second number is equal to the number of migration subunits after the splitting, it is determined that all the multiple migration subunits are migrated to the HDDs. For example, if the migration unit is split into four migration subunits, the number of migration subunits obtained after the split migration unit and currently located in the SSDs may be recorded; if the number is 4 at the beginning, when the data becomes cold, one of the migration subunits is migrated back to the HDDs, and the number decreases by 1; and, gradually, when the number becomes zero, it indicates that all the four migration subunits obtained after the split migration unit have become cold and migrated down to the HDDs.

When all the migration subunits are migrated down to the HDDs, an integration process is triggered so that the multiple migration subunits are re-integrated into a migration unit. It is assumed that, when the migration unit is split into migration subunits and migrated down to the HDDs, the initial large-sized storage unit of the HDDs is split into small-sized storage subunits for storing the migration subunits. For example, a storage unit is split into four storage subunits, and one migration subunit migrated down is stored in one of the storage subunits; and the subsequent three migration subunits migrated down may be stored in other storage subunits obtained after the split storage unit of the HDDs, each migration subunit occupies a part of metadata storage resources, and the IO statistics are performed by using the migration subunit as a unit. When it is detected that all the four migration subunits are migrated down, the migration subunits will be re-integrated into a migration unit. That is, the four storage subunits are also re-integrated into a large-sized storage unit. In this case, due to decrease of the number of migration units, the consumption of metadata storage resources decreases, and the consumption of the metadata storage resources is controlled, and the IO statistics begin to be performed by using the integrated migration unit as a unit. In addition, the storage address information of each migration subunit, which is recorded when the migration unit is in a split state, changes back to the storage address information of the migration unit, and the resources occupied by the maintained count value of the migration subunits obtained after the split migration unit are released and the count value is not maintained any longer.

In the method for a storage device processing data in this embodiment, when a migration unit is migrated to a high-tier disk, a data access frequency of each migration subunit is detected respectively so that hot data can be identified more easily; and when cold data is identified, the migration subunit corresponding to the cold data can be migrated to a low-tier disk, thereby reducing waste of the storage space of the high-tier disks, so that the high-tier disks store only hot data, and improving the usage of storage media; in addition, when all migration subunits are migrated to the low-tier disks, integration can be performed by combining all the migration subunits into a migration unit, thereby reducing the number of migration units in time and controlling metadata storage resource consumption effectively.

Embodiment 3

Figure 3:
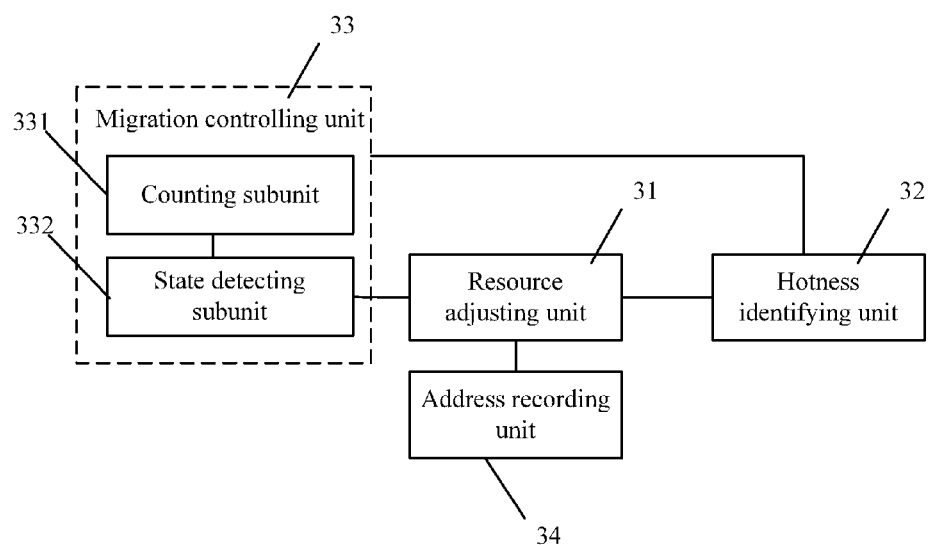
FIG. 3 is a schematic structural diagram of an embodiment of an apparatus for tiered storage processing of data according to the present invention.

FIG. 3 is a schematic structural diagram of an embodiment of an apparatus for tiered storage processing of data according to the present invention. The apparatus can perform the method for a storage device processing data according to any embodiment of the present invention. This embodiment only gives a brief description about the structure of the apparatus. For detailed working principles of the apparatus, reference may be made to the description in the method embodiment.

As shown in FIG. 3, the apparatus may include a resource adjusting unit 31, a hotness identifying unit 32, a migration controlling unit 33, and an address recording unit 34.

The resource adjusting unit 31 is configured to split a migration unit into multiple migration subunits, and combine the multiple migration subunits into the migration unit.

The hotness identifying unit 32 is configured to detect a data access frequency of each migration subunit respectively.

The migration controlling unit 33 is configured to: migrate a migration unit in low-tier disks to high-tier disks; migrate the migration subunit to the low-tier disks when the hotness identifying unit detects that the data access frequency of the migration subunit is lower than a set threshold; and, detect whether the multiple migration subunits are all migrated to the low-tier disks.

The apparatus may further include an address recording unit 34, which is specifically configured to, after the migration unit is split into multiple migration subunits and before the multiple migration subunits are combined into the migration unit, record storage address information of the multiple migration subunits respectively, for example, record a mapping relationship between the migration unit and the multiple migration subunits; and record current physical storage addresses of the multiple migration subunits.

The migration controlling unit 33 is further configured to detect whether a storage unit corresponding to a size of the migration unit exists in the high-tier disks and, if a result of the detection is yes, migrate the migration unit to the storage unit; and the resource adjusting unit 31 is further configured to split the migration unit into multiple migration subunits if a migration subunit exists whose data access frequency is lower than a set threshold.

Further, the migration controlling unit 33 is specifically configured to detect whether a storage unit corresponding to a size of the migration unit exists in the high-tier disks, and the resource adjusting unit 31 is specifically configured to split the migration unit into multiple migration subunits if a result of the detection of the migration controlling unit is no.

Further, the migration controlling unit 33 includes a counting subunit 331 and a state detecting subunit 332. The counting subunit 331 is configured to obtain a first number of the migration subunits in the high-tier disks, or obtain a second number of the migration subunits in the low-tier disks, and the state detecting subunit 332 is configured to determine that the multiple migration subunits are all migrated to the low-tier disks if the first number is zero or the second number is equal to the number of migration subunits obtained after the split migration unit.

With the apparatus for tiered storage processing of data in this embodiment, when a migration unit is migrated to high-tier disks, a data access frequency of each migration subunit is detected respectively so that hot data can be identified more easily, and when cold data is identified, the migration subunit corresponding to the cold data can be migrated to low-tier disks, thereby reducing waste of the storage space of the high-tier disks, so that the high-tier disks store only hot data, and improving the usage of storage media; in addition, when all migration subunits are migrated to the low-tier disks, integration can be performed by combining all the migration subunits into a migration unit, thereby reducing the number of migration units in time and controlling metadata storage resource consumption effectively.

Embodiment 4

The present invention provides a storage device, where the device includes low-tier disks and high-tier disks, and further includes an apparatus for tiered storage processing of data provided in any embodiment of the present invention, where the apparatus for tiered storage processing of data is connected to the low-tier disks and the high-tier disks respectively.

With the apparatus for tiered storage processing of data in the storage device, when a migration unit is migrated to high-tier disks, a data access frequency of each migration subunit is detected respectively, and when cold data is identified, the migration subunit corresponding to the cold data can be migrated to low-tier disks, thereby reducing waste of the storage space of the high-tier disks, so that the high-tier disks stores only hot data, and improving the usage of storage media; in addition, when all migration subunits are migrated to the low-tier disks, integration can be performed by combining all the migration subunits into a migration unit, thereby reducing the number of migration units in time and controlling metadata storage resource consumption effectively.

Persons of ordinary skill in the art may understand that, all or a part of the steps of the foregoing method embodiments may be implemented by a program instructing relevant hardware. The foregoing programs may be stored in a computer readable storage medium. When the program runs, the steps of the forgoing method embodiments are performed. The foregoing storage medium includes various mediums capable of storing program codes, such as a read only memory (ROM), a random access memory (RAM), a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as the modifications and replacements do not cause the essence of corresponding technical solutions to depart from the spirit and scope of the technical solutions of the embodiments of the present invention.

What is claimed is:

1. A method for a storage device to migrate hot and cold data between high-performance storage and low-performance storage at block and sub-block granularities, wherein the storage device comprises a first storage disk set and a second storage disk set, wherein the first storage disk set includes a plurality of storage disks with high performance, and wherein the second storage disk set includes a plurality of storage disks with low performance, the method comprising:
   monitoring an access frequency of a block stored in the second storage disk set, wherein the block includes multiple sub-blocks;
   determining that the access frequency of the block has reached a first access threshold value;
   moving the block to the first storage disk set after the access frequency of the block reaches above the first access threshold value;
   obtaining an access frequency for each of the multiple sub-blocks after the block is moved to the first storage disk set, wherein the multiple sub-blocks are independently accessible, wherein each of the multiple sub-blocks has an access frequency that is independent from access frequencies of other sub-blocks and the access frequency of the block;
   separating the block into the multiple sub-blocks when the access frequency of at least one of the multiple sub-blocks falls below a second access threshold value;
   moving the at least one of the multiple sub-blocks to the second storage disk set; and
   combining all of the multiple sub-blocks into the block after each of the multiple sub-blocks is moved to the second storage disk set when the access frequency of each of the multiple sub-blocks falls below the second access threshold value.

2. The method according to claim 1, further comprising creating a mapping between the block and each of the multiple sub-blocks.

3. The method according to claim 1, further comprising storing a physical address of the block after the block is moved to the first storage disk set.

4. The method according to claim 1, wherein moving the block to the first storage disk set comprises:
   determining whether the first storage disk set includes a storage unit having a size that is greater than a size of the block; and
   moving the block to the storage unit when the first storage disk includes the storage unit having the size that is greater than the size of the block.

5. A storage device configured to migrate hot and cold data between high-performance storage and low-performance storage at block and sub-block granularities, comprising:
   a processor;
   a first storage disk set comprising a plurality of storage disks with high performance;
   a second storage disk set comprising a plurality of storage disks with low performance;
   a communication interface coupled to the processor; and
   a communication bus coupled to the processor, the first storage disk set, and the second storage disk set,
   wherein the processor is configured to:
   communicate with the communication interface through the communication bus;
   obtain an access frequency of a block stored at the second storage disk set, wherein the block includes multiple sub-blocks;
   move the block to the first storage disk set when the access frequency of the block reaches the first access threshold value,
   obtain an access frequency of each of the multiple sub-blocks after the block is moved to the first storage disk set, wherein the multiple sub-blocks are independently accessible, wherein each of the multiple sub-blocks has an access frequency that is independent from access frequencies of other sub-blocks, and wherein the access frequency of each of the multiple sub-blocks is independent from the access frequency of the block;
   separate the block into the multiple sub-blocks when the access frequency of at least one of the multiple sub-blocks is less than a second access threshold value;
   move the at least one of the multiple sub-blocks to the second storage disk set; and
   combine each of the multiple sub-blocks into the block after each of the multiple sub-blocks is moved to the second storage disk set when the access frequency of each of the multiple sub-blocks fall below the second access threshold value.

6. The device according to claim 5, wherein the processor is further configured to create a mapping between the block and each of the multiple sub-blocks.

7. The device according to claim 5, wherein the processor is further configured to store a physical address of the block after the block is moved to the first storage disk set.

8. The device according to claim 5, wherein the processor is further configured to:
- determine whether the first storage disk set includes a storage unit having a size that is greater than a size of the block; and
- move the block to the storage unit based on the determination.

* * * * *